US009463673B2

(12) United States Patent
Huang et al.

(10) Patent No.: US 9,463,673 B2
(45) Date of Patent: Oct. 11, 2016

(54) TIRE POSITIONING METHOD AND TIRE POSITIONING SYSTEM

(71) Applicant: INDUSTRIAL TECHNOLOGY RESEARCH INSTITUTE, Hsinchu (TW)

(72) Inventors: Shih-Ching Huang, Kaohsiung (TW); Chin-Chia Chang, Tainan (TW); Chung-Yuan Su, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 41 days.

(21) Appl. No.: 14/564,875

(22) Filed: Dec. 9, 2014

(65) Prior Publication Data
US 2016/0096403 A1  Apr. 7, 2016

(30) Foreign Application Priority Data

Oct. 1, 2014  (TW) .............................. 103134232 A

(51) Int. Cl.
*B60C 23/04* (2006.01)
*B60C 23/20* (2006.01)
*G01M 17/02* (2006.01)

(52) U.S. Cl.
CPC ....... *B60C 23/0416* (2013.01); *B60C 23/0433* (2013.01); *B60C 23/0483* (2013.01);
(Continued)

(58) Field of Classification Search
CPC .................. B60C 23/0416; B60C 2019/004; B60C 23/0433; B60C 23/0483; B60C 23/0488; B60C 23/20; G01M 17/02
See application file for complete search history.

(56) References Cited

U.S. PATENT DOCUMENTS 5,774,048 A * 6/1998 Achterholt .......... B60C 23/0408
340/442
6,204,758 B1  3/2001 Wacker et al.
(Continued)

FOREIGN PATENT DOCUMENTS

CN  101835638 A  9/2010
CN  103303073 A  9/2013
(Continued)

OTHER PUBLICATIONS

Li Wenjun et al., "A Wireless and Real-Time Monitoring System Design for Car Networking Applications", International Journal of Antennas and Propagation, 2013, 5 pages.
(Continued)

*Primary Examiner* — Russell Frejd
(74) *Attorney, Agent, or Firm* — Muncy, Geissler, Olds & Lowe, P.C.

(57) ABSTRACT

A tire positioning method includes the following steps. Four wireless signals transmitted from four tires of a car are received by a wireless signal receiver. Each wireless signal includes a uniaxial acceleration. One of the tires which is located at a first location is identified according to the intensity of the wireless signals. The first location is the closest to the wireless signal receiver. When the car makes a turn, one of the tires which is located at a second location is identified according to the direction of each uniaxial acceleration. The second location and the first location are both located at one side of the car. The direction of the uniaxial acceleration of the tire which is located at the first location is identical to that of the tire which is at the second location. The side of the car is right side or left side.

12 Claims, 5 Drawing Sheets

(52) U.S. Cl.
CPC ........... *B60C23/0488* (2013.01); *B60C 23/20* (2013.01); *G01M 17/02* (2013.01); *B60C 2019/004* (2013.04)

(56) References Cited

U.S. PATENT DOCUMENTS

| | | | |
|---|---|---|---|
| 7,010,968 B2 | 3/2006 | Stewart et al. | |
| 7,023,334 B2* | 4/2006 | Fischer | B60C 23/0416 340/442 |
| 7,089,099 B2* | 8/2006 | Shostak | B60C 23/005 701/29.6 |
| 7,146,853 B2* | 12/2006 | Fischer | B60C 23/0416 73/146 |
| 7,834,747 B2* | 11/2010 | Achterholt | B60C 23/0416 340/445 |
| 7,866,206 B2* | 1/2011 | Achterholt | B60C 23/0416 73/146.5 |
| 8,332,103 B2 | 12/2012 | Greer et al. | |
| 8,744,692 B2* | 6/2014 | Carresjo | B60C 23/0416 701/48 |
| 2009/0071249 A1* | 3/2009 | Kitazaki | B60C 19/00 73/514.33 |
| 2010/0274441 A1* | 10/2010 | Carresjo | B60C 23/0416 701/31.4 |
| 2012/0319831 A1 | 12/2012 | Maehara et al. | |
| 2013/0085710 A1* | 4/2013 | Kautzsch | B60C 23/0488 702/141 |
| 2013/0169428 A1* | 7/2013 | Shima | B60C 23/0416 340/447 |
| 2014/0058580 A1 | 2/2014 | Peine et al. | |
| 2014/0076040 A1* | 3/2014 | Shima | B60C 23/0416 73/146.5 |

FOREIGN PATENT DOCUMENTS

| | | | | |
|---|---|---|---|---|
| CN | 103434349 | | 12/2013 | |
| DE | 19608478 | * | 5/1997 | ............ B60C 23/04 |
| DE | 19856861 | * | 6/2000 | ............ B60C 23/04 |
| DE | 10307265 | * | 10/2003 | ............ B60C 23/04 |
| DE | 10316074 | * | 10/2004 | ............ B60C 23/04 |
| EP | 1452349 | * | 9/2004 | ............ G01L 17/00 |
| TW | I319360 | | 1/2010 | |
| TW | M436579 U | | 2/2012 | |
| TW | 201319540 A1 | | 5/2013 | |
| TW | 201412574 A | | 4/2014 | |

OTHER PUBLICATIONS

Yeh et al., "Novel TPMS Sensing Chip With Pressure Sensor Embedded in Accelerometer", Transducers, Jun. 2013, pp. 1759-1762.

Wei et al., "Monolithic Pressure+Acceleration Sensor With Self-Test Function for Reliable & Low-Cost Tire-Pressure-Monitoring-System (TPMS) Applications", Transducers, Jun. 5-9, 2011, pp. 1006-1009.

Wang et al., "A Novel Monolithically Integrated Pressure, Accelerometer and Temperature Composite Sensor", Transducers, Jun. 21-25, 2009, pp. 1118-1121.

Gogoi et al., "Integration Technology for MEMS Automotive Sensors", IECON 02 [Industrial Electronics Society, IEEE 2002 28th Annual Conference of the], Nov. 5-8, 2002, pp. 2712-2717.

* cited by examiner

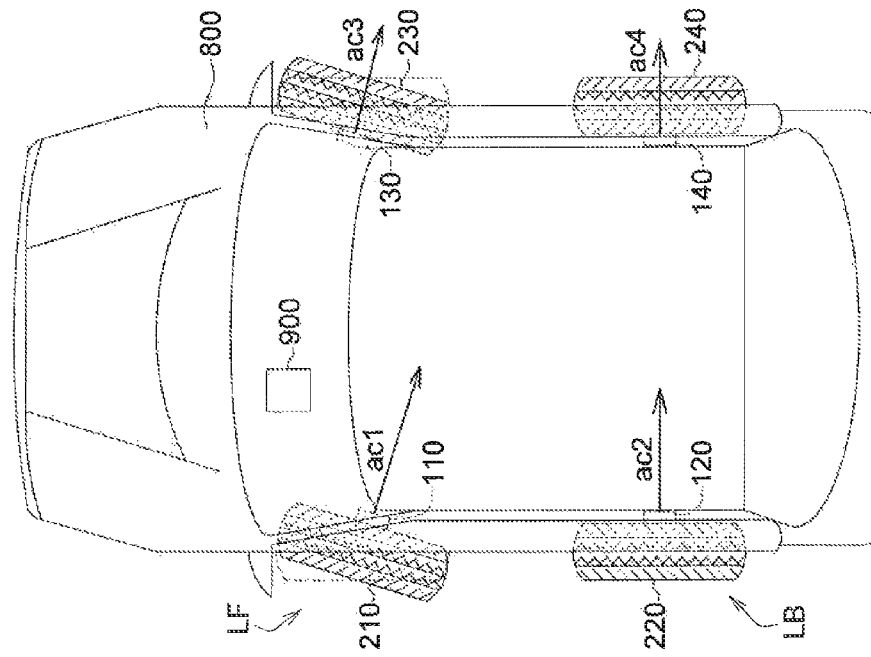
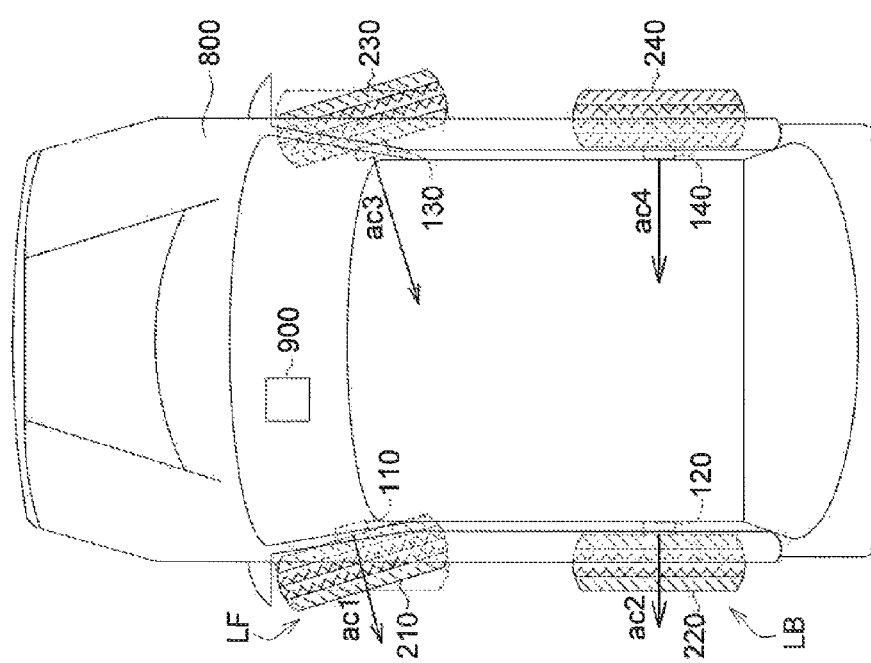

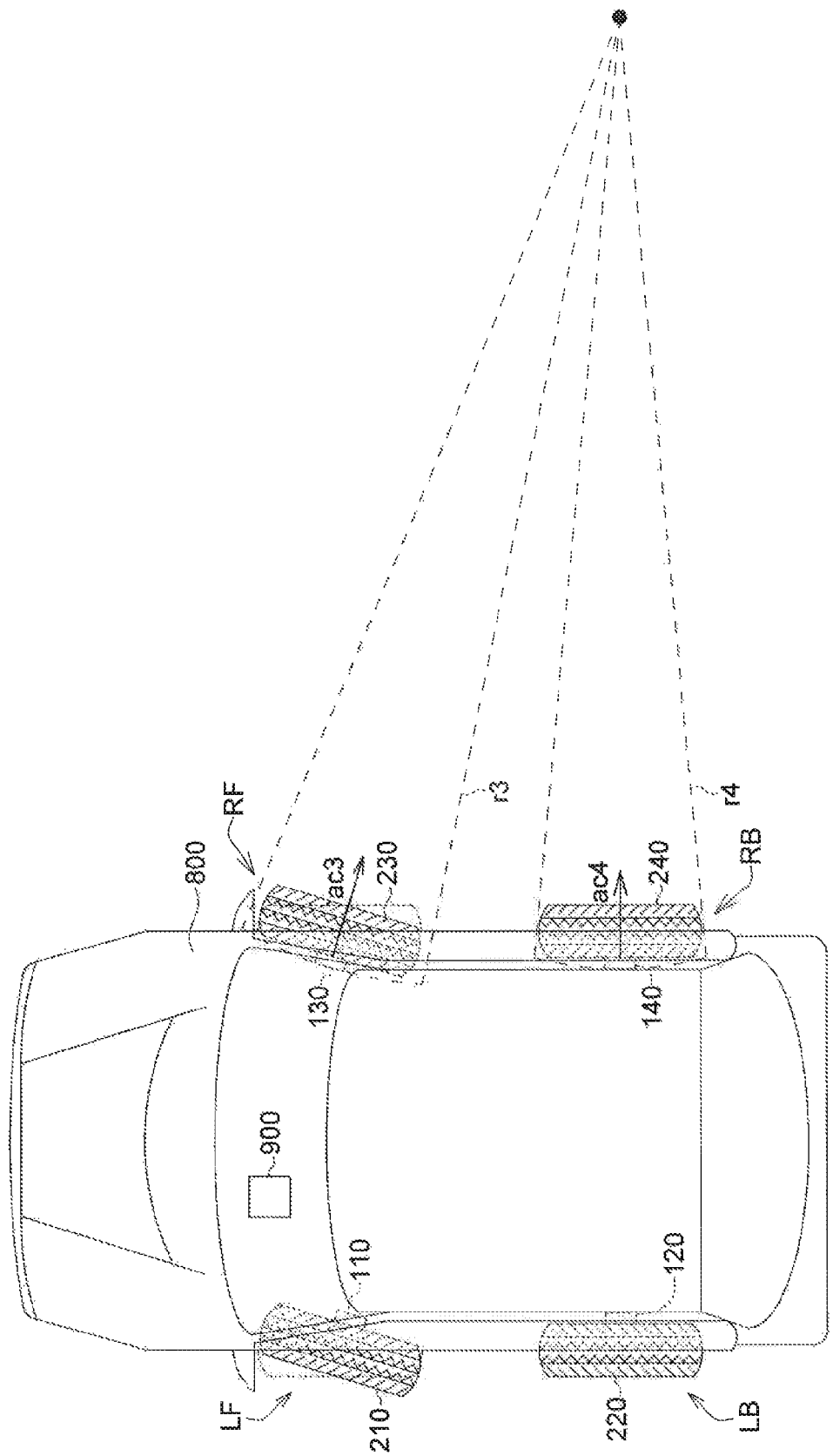

TIRE POSITIONING METHOD AND TIRE POSITIONING SYSTEM

This application claims the benefit of Taiwan Application No. 103134232, filed on Oct. 1, 2014, the content of which is incorporated herein by reference.

TECHNICAL FIELD

The present invention relates to a positioning method and system, and more particularly, to a positioning method and system of tires in a vehicle.

BACKGROUND

The condition of tires is corresponding to the safety when a vehicle is driven. For example, flat tires may occur when driving with low tire pressure, and then result in car accidents. In addition, conditions of tire wear and tire run-out are also important information. Therefore, a tire monitoring system is often implemented to secure the conditions of tires.

However, tire wear between the front tires and the rear tires is significant different after a period of time of driving, so the front tires are often changed places with the rear tires over and over. As a result, the tire monitoring system are easily gotten confused of the positions of tires. Therefore, a tire positioning method and system is required to keep the safety of driving.

SUMMARY

The present disclosure is directed to a tire positioning method and a tire positioning system.

In one aspect of the present disclosure, a tire positioning method comprises: receiving four wireless signals transmitted by four tires of a vehicle by a wireless signal receiver, wherein each of the wireless signals comprises a uniaxial acceleration; identifying a tire of the tires at a first position according to the intensity of the wireless signals, wherein the tire at the first position is closest to the wireless signal receiver; identifying a tire of the tires at a second position according to the positive direction of the uniaxial accelerations when the vehicle make a turn, wherein the first position and the second position are both at the left side of the vehicle or both at the right side of the vehicle; wherein the positive direction of uniaxial acceleration of the tire at the first position is identical to the positive direction of uniaxial acceleration of the tire at the second position.

In another aspect of the present disclosure, a tire positioning system comprises: four peripheral devices, each of the peripheral devices comprising: a uniaxial accelerometer disposed at one of four tires of a vehicle for measuring a uniaxial acceleration; a wireless signal transmitter disposed at one of the tires of the vehicle for transmitting a wireless signal, wherein the wireless signal comprises the uniaxial acceleration; and a central controlling device comprising: a wireless signal receiver for receiving the wireless signals; and a processor for identifying a tire of the tires at a first position according to the intensity of the wireless signals and a tire of the tires at a second position according to the direction of the uniaxial accelerations, wherein the tire at the first position is closest to the wireless signal receiver, wherein the first position and the second position are both located at the left or the right side of the vehicle, wherein the direction of the uniaxial acceleration of the tire at the first position is identical to the uniaxial acceleration of the tire at the second position.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein:

FIG. 4A shows the process S230 in FIG. 2 when the vehicle makes a left turn.

FIG. 4B shows the process S230 in FIG. 2 when the vehicle makes a right turn.

FIG. 5B shows the process S240 in FIG. 2 when the vehicle makes a right turn.

Figure 1:
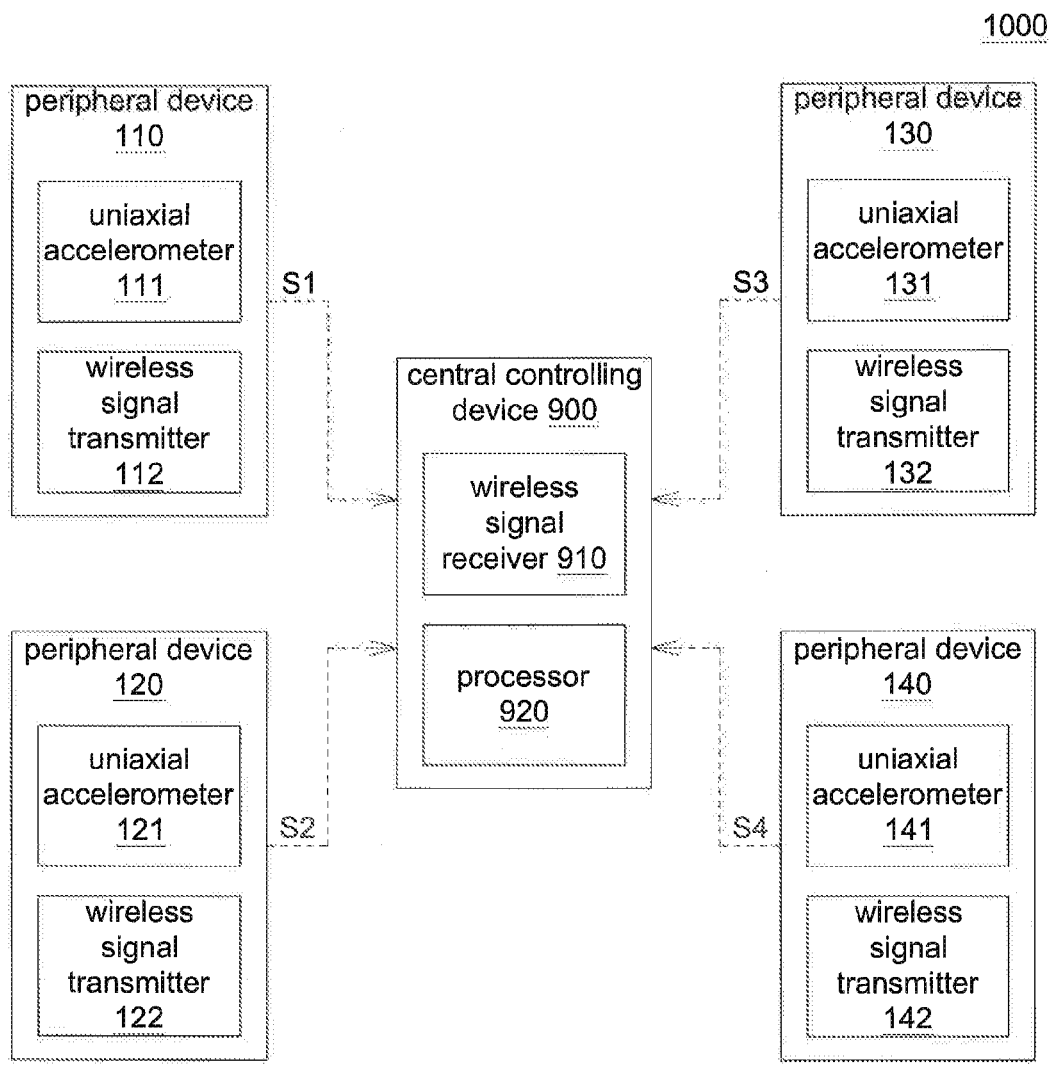
FIG. 1 shows a tire positioning system in accordance with one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The present disclosure will now be described in detail with reference to the accompanying drawings, wherein the same reference numerals will be used to identify the same or similar elements throughout the several views. It should be noted that the drawings should be viewed in the direction of orientation of the reference numerals.

Figure 3:
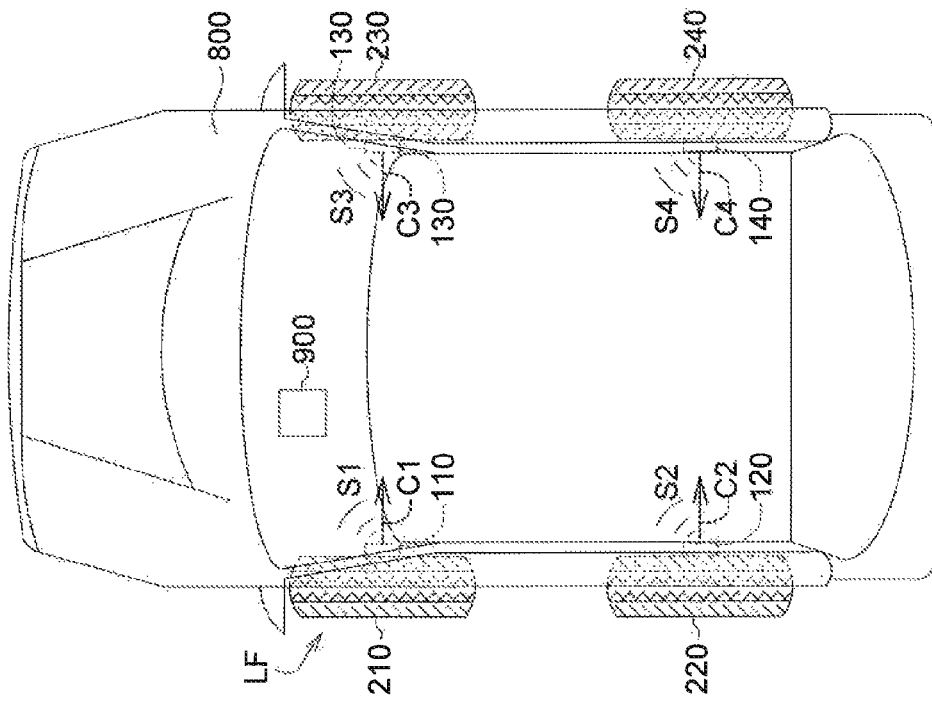
FIG. 3 shows a vehicle with a tire positioning system in accordance with one embodiment of the present disclosure.

FIG. 1 shows a tire positioning system 1000 in accordance with one embodiment of the present disclosure. The tire positioning system 1000 comprises four peripheral devices 110, 120, 130, 140, and a central controlling device 900. The peripheral devices 110, 120, 130, 140 are respectively disposed on tires 210, 220, 230, 240, which are shown in FIG. 3. The tire positioning system 1000 automatically identifies locations of each tire 210, 220, 230, 240. Moreover, the tire positioning system 1000 may further comprise a tire pressure sensor, a tire wear sensor, or a tire run-out sensor to monitoring the condition of each tire, so as to keep the driving safety.

The peripheral devices 110, 120, 130, 140 respectively comprise uniaxial accelerometers 111, 121, 131, 141 and wireless signal transmitter 112, 122, 132, 142. The uniaxial accelerometers 111, 121, 131, 141 measure a uniaxial acceleration of each of the tires 210, 220, 230, 240 respectively. The positive direction of each of the uniaxial accelerations C1, C2, C3, C4 is toward inside the vehicle 800. In the other words, the positive directions of uniaxial accelerations C1, C2 of the uniaxial accelerometers 111, 121 are toward the right of the vehicle 800, and the positive directions of uniaxial accelerations C3, C4 of the uniaxial accelerometers 131, 141 are toward the left of the vehicle 800.

The wireless signal transmitters 112, 122, 132, 142 are respectively disposed on the tires 210, 220, 230, 240 and respectively transmit wireless signals S1, S2, S3, S4. The wireless signals S1, S2, S3, S4 respectively comprise the uniaxial acceleration of each of the uniaxial accelerometers 111, 121, 131, 141. In another embodiment, peripheral devices 110, 120, 130, 140 may further comprise a tire pressure sensor, a tire wear sensor, or a tire run-out sensor, and the wireless signals S1, S2, S3, S4 may respectively further comprise tire pressures, tire worn conditions, or tire run-out conditions of the tires 210, 220, 230, 240.

The central controlling device 900 comprises a wireless signal receiver 910 and a processor 920. The wireless signal receiver 910 receives the wireless signals S1, S2, S3, S4 of the wireless signal transmitter 112, 122, 132, 142. The wireless signal receiver 910 and the wireless signal transmitter 112, 122, 132, 142 communicate by, for example, Bluetooth, WLAN, or radio frequency.

The processor 920 analyzes and computes the received wireless signals S1, S2, S3, S4. In one embodiment, the processor 920 is a computer of the vehicle 800. The processor 920 may further comprise functions of navigation, media, electrical door lock, or air condition.

Figure 2:
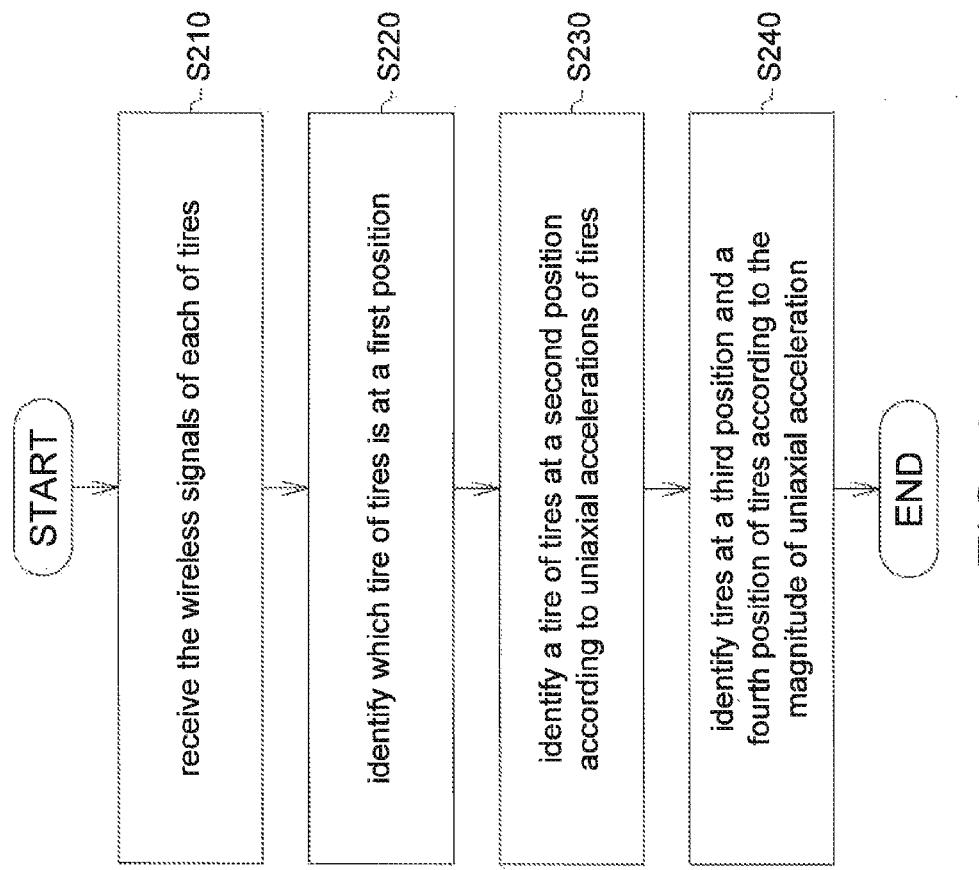
FIG. 2 illustrates a flow chart of the process in accordance with one embodiment of the present disclosure.

FIG. 2 illustrates a flow chart of the process in accordance with one embodiment of the present disclosure. In S210, the wireless signal receiver 910 receives the wireless signals S1, S2, S3, S4 of each of the tires 210, 220, 230, 240. In S220, the processor 920 of the central controlling device 900 identifies which tire of tires 210, 220 230, 240 is at a first position. In one embodiment, the first position is the closest position to the wireless signal receiver 910.

FIG. 3 shows a vehicle with a tire positioning system in accordance with one embodiment of the present disclosure. In the embodiment, the central controlling device 900 is disposed at the left front seat of the vehicle 800, and the first position is located at the left front side LF. The wireless signal S1 received by the wireless signal receiver 910 has the highest signal intensity, which represents the peripheral device 110 is closest to the central controlling device 900. Therefore, the tire 210 at the left front position LF is identified by the processor 920 of the central controlling device 900.

In S230, when the vehicle 800 makes a turn, the central controlling device 900 identifies a tire of the tires 210, 220, 230, 240 at a second position according to uniaxial accelerations of the tires 210, 220, 230, 240. The second position and the first position are at the same side of the wireless signal receiver 910, for example, the left side or the right side of the wireless signal receiver 910. The positive directions of uniaxial accelerations of the tires at the first position and the second position are toward the same direction, for example, the right side or the left side of the vehicle 800.

FIG. 4A shows the process S230 in FIG. 2 in which the vehicle makes a left turn. In the embodiment, the central controlling device 900 is disposed at the left front seat of the vehicle 800, the first position is the left front side LF, and the second position is the left back side LB. The left front side LF and the left back side LB are both located at the left side of the central controlling device 900. A uniaxial acceleration ac1 of the tire 210 at the left front side LF and a uniaxial acceleration ac2 of the tire 220 at the left back side LB are both negative. Uniaxial acceleration ac3 and ac4 of the tires 230 and 240 are both positive. As a result, after the tire 210 is identified at the left front side LF, the tire 220 at the left back side LB is identified by the processor 920 of the central controlling device 900 according to the directions of the uniaxial accelerations ac1, ac2, ac3 and ac4.

FIG. 4B shows the process S230 in FIG. 2 when the vehicle makes a right turn. In the embodiment, the central controlling device 900 is disposed at the left front seat of the vehicle 800, the first position is the left front side LF, and the second position is the left back side LB. The left front side LF and the left back side LB are both located at the left side of the central controlling device 900. The uniaxial acceleration ac1 of the tire 210 at the left front side LF and the uniaxial acceleration ac2 of the tire 220 at the left back side LB are both positive. Uniaxial acceleration ac3 and ac4 of the tires 230 and 240 are both negative. As a result, after the tire 210 is identified at the left front side LF, the tire 220 at the left back side LB is identified by the processor 920 of the central controlling device 900 according to the directions of the uniaxial accelerations ac1, ac2, ac3 and ac4.

In S240, when the vehicle 800 makes a turn, the central controlling device 900 identifies tires of the tires 210, 220, 230, 240 at a third position and at a fourth position according to the magnitude of uniaxial acceleration ac1, ac2, ac3, ac4. The third position and the fourth position are both located at another side of the wireless signal receiver 910 of the central controlling device 900. For example, the first position and the second position are both at the left side of the wireless signal receiver 910, and then the third position and the fourth position are both at the right side of the wireless signal receiver 910. In the embodiment, the third position is located at the right front side RF of the vehicle 800, and the fourth position is located at the right back side RB of the vehicle 800. The uniaxial acceleration ac3 of the tire 230 is larger than the uniaxial acceleration ac4 of the tire 240.

Figure 5A:
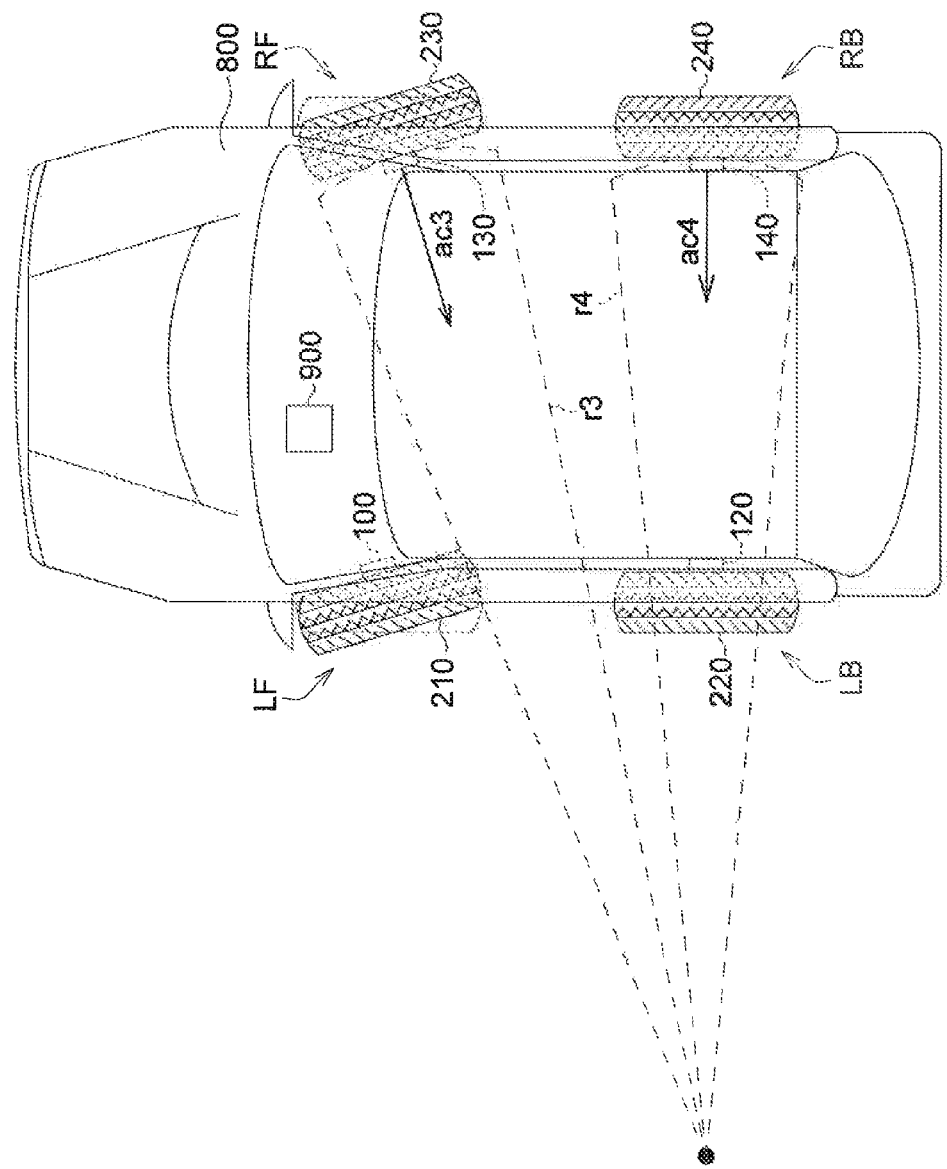
FIG. 5A shows the process S240 in FIG. 2 when the vehicle makes a left turn.

FIG. 5A shows the process S240 in FIG. 2 when the vehicle makes a left turn. In the embodiment, the central controlling device 900 is disposed at the left front seat, the first position is the left front side LF, the second position is the left back side LB, the third position is the right front side RF, and the fourth position is the right back side RB. A turning radius r3 is larger than a turning radius r4, as a result, the uniaxial acceleration ac3 of the tire 230 at the right front side RF is larger than the uniaxial acceleration ac4 of the tire 240 at the right back side RB according to the kinetic principles "A=Rw2", in which A is represent for centripetal acceleration. After the tire 210 located at the left front side LF and the tire 220 located at the left back side LB are identified, the tires 230, 240 which are respectively located at the right front side RF and the right back side RB are identified by the processor 920 of the central controlling device 900 according to the uniaxial acceleration ac3 and ac4.

FIG. 5B shows the process S240 in FIG. 2 when the vehicle makes a right turn. In the embodiment the central controlling device 900 is disposed at the left front seat, the first position is the left front side LF, the second position is the left back side LB, the third position is the right front side RF, and the fourth position is the right back side RB. A turning radius r3 is larger than a turning radius r4, as a result, the uniaxial acceleration ac3 of the tire 230 at the right front side RF is larger than the uniaxial acceleration ac4 of the tire 240 at the right back side RB. After the tire 210 located at the left front side LF and the tire 220 located at the left back side LB are identified, the tire 230, 240 which are respectively located at the right front side RF and the right back side RB are identified by the processor 920 of the central controlling device 900 according to the uniaxial acceleration ac3 and ac4.

In another embodiment of the disclosure, the central controlling device 900 may be disposed at the right front seat, the right back seat, or the left back seat of the vehicle 800. The central controlling device 900 may also identify the closest tire as the initiate of the positioning process.

In the illustrated embodiment of the disclosure, the positions of the tires 210, 220, 230, 240 of the vehicle 800 are identified after the vehicle makes a single turn. The identification process is made without scanning barcode, or manual setup which may cause accidentally mistake.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A tire positioning method, comprising:
   receiving four wireless signals transmitted by four tires of a vehicle by a wireless signal receiver, wherein each of the wireless signals comprises only a uniaxial acceleration;
   identifying a tire of the tires at a first position according to the intensity of the wireless signals, wherein the tire at the first position is closest to the wireless signal receiver; and
   identifying a tire of the tires at a second position according to the positive direction of the uniaxial accelerations when the vehicle make a turn, wherein the first position and the second position are both at the left side of the vehicle or both at the right side of the vehicle;
   wherein the positive direction of uniaxial acceleration of the tire at the first position is identical to the positive direction of uniaxial acceleration of the tire at the second position.

2. The tire positioning method according to claim 1, wherein the wireless signal receiver is disposed at a left front seat of the vehicle, the first position is at the left front side of the vehicle, and the second position is at the left back side of the vehicle.

3. The tire positioning method according to claim 1, wherein the wireless signal receiver is disposed at a right front seat of the vehicle, the first position is at the right front side of the vehicle, and the second position is at the right back side of the vehicle.

4. The tire positioning method according to claim 1, further comprising:
   identifying a tire of the tires at a third position and a tire of tires at a fourth position according to the uniaxial accelerations, wherein the third position and the fourth position are both located at an opposite side of the vehicle to the first position and the second position;
   wherein the third position is located at the front side of the vehicle, the fourth position is located at the back side of the vehicle, and the uniaxial acceleration of the tire at the third position is larger than the uniaxial acceleration of the tire at the fourth position.

5. The tire positioning method according to claim 1, wherein the directions of the uniaxial accelerations of the tires are respectively parallel to the axle of each of the tires.

6. A tire positioning system, comprising:
   four peripheral devices, each of the peripheral devices comprising:
      a uniaxial accelerometer disposed at one of four tires of a vehicle for measuring a uniaxial acceleration; and
      a wireless signal transmitter disposed at one of the tires of the vehicle for transmitting a wireless signal, wherein the wireless signal comprises only the uniaxial acceleration; and
   a central controlling device comprising:
      a wireless signal receiver for receiving the wireless signals; and
      a processor for identifying a tire of the tires at a first position according to the intensity of the wireless signals and a tire of the tires at a second position according to the direction of the uniaxial accelerations, wherein the tire at the first position is closest to the wireless signal receiver, wherein the first position and the second position are both located at the left or the right side of the vehicle, wherein the direction of the uniaxial acceleration of the tire at the first position is identical to the uniaxial acceleration of the tire at the second position.

7. The tire positioning system according to claim 6, wherein the central controlling device is disposed at a left front seat of the vehicle, the first position is located at the left front side of the vehicle, and the second position is located at the left back side of the vehicle.

8. The tire positioning system according to claim 6, wherein the central controlling device is disposed at a right front seat of the vehicle, the first position is located at the right front side of the vehicle, and the second position is located at the right back side of the vehicle.

9. The tire positioning system according to claim 6, wherein the processor further identifies a tire of the tires at a third position and a tire of the tires at a fourth position according to a magnitude of each of the uniaxial accelerations, the third and the fourth position are located at an opposite side of the vehicle to the first and the second position, the third position is located at the front side of the vehicle and the fourth position is located at the back side of the vehicle, and the uniaxial acceleration of the tire at the third position is larger than the uniaxial acceleration of the tire at the fourth position.

10. The tire positioning system according to claim 6, wherein the directions of the uniaxial accelerations of the tires are respectively parallel to the axle of each of the tires.

11. The tire positioning system according to claim 6, wherein each of the peripheral devices further comprises:
    one of a tire pressure sensor for measuring a tire pressure of one of the tires,
    a tire wear sensor for measuring a condition of tire wear of one of the tires, and
    a tire run-out sensor for measuring a condition of tire run-out of one of the tires.

12. The tire positioning system according to claim 6, wherein the wireless signal receiver and the wireless signal transmitter communicate by Bluetooth, WLAN, or radio frequency.

* * * * *